United States Patent [19]

Billows et al.

[11] 3,824,828

[45] July 23, 1974

[54] PREPARATION OF LITHOGRAPHIC PLATES

[75] Inventors: Leonard Kay Billows, Hemel Hempstead; Raymond John Gosling, Cranleigh, both of England

[73] Assignee: Protocol Engineering Limited, St. Albans, Hertfordshire, England

[22] Filed: Nov. 14, 1972

[21] Appl. No.: 306,416

Related U.S. Application Data

[62] Division of Ser. No. 86,259, Nov. 2, 1970, abandoned.

[30] Foreign Application Priority Data

Nov. 3, 1969 Great Britain .................... 53863/69

[52] U.S. Cl. .............................. 72/181, 72/DIG. 18

[51] Int. Cl. .............................................. B21d 5/08

[58] Field of Search ....... 72/220, 181, DIG. 18, 176

[56] References Cited

UNITED STATES PATENTS

| | | | |
|---|---|---|---|
| 1,426,253 | 8/1922 | Bremer | 72/DIG. 18 |
| 3,462,989 | 8/1969 | Fischer, Jr. | 72/178 |
| 3,535,905 | 10/1970 | Frizell | 72/220 |
| 3,628,361 | 12/1971 | Rupa | 72/181 |
| 3,689,970 | 9/1972 | Falkner | 29/155 R |

*Primary Examiner*—Milton S. Mehr
*Attorney, Agent, or Firm*—Brisebois & Kruger

[57] ABSTRACT

This invention relates to the preparation of lithographic plates for printing purposes, one of its objects being to provide a flow system to speed up the plate preparation, ready for the press. From one aspect, the invention provides a system for preparing the plates which comprises a light box for printing down plates fed thereto from prepared masters, such as camera films, after which the exposed lithographic plate is conveyed by a transfer system to a processing station for development, fixing and washing, and then the plate is fed to an edge-forming station to prepare and edge-form the plates for transfer to a printing drum. The specification also describes a machine for edge-forming the plates comprising a fixed former plate to which the lithographic plate is fed and a set of rollers is provided, together with means for relative movement of the former with the plate on it and the said rollers, so that projecting edges of the plate are formed over the adjacent edges of the former. A travelling pin system is also provided to engage in register holes in edge areas of the plate to enable a plurality of plates to be fed sequentially to the former. The former is also provided with means for reducing its width, after edge-formation of the lithographic plates, which means are automatically operated at the end of the said relative movement operation.

2 Claims, 6 Drawing Figures

PREPARATION OF LITHOGRAPHIC PLATES

Figure 1:
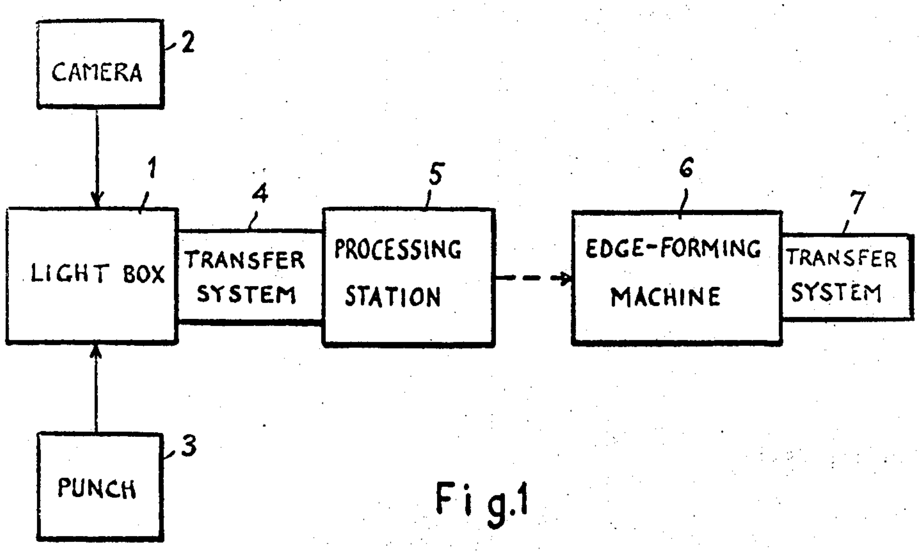

This is a division of application Ser. No. 86,259, filed Nov. 2, 1970, now abandoned.

The present invention relates to systems for the preparation of lithographic plates for printing purposes, particularly for printing of colour on newsprint by the offset process.

In the printing of newspapers, speed in the preparation of the lithographic plates for use therein is essential since, if the plates are not ready in time, the printing edition of the paper is held up, which results in a highly uncompetitive situation.

Colour pictures are being increasingly used in the production of newspapers but it is a costly operation and has not come into more universal use hitherto, owing to the prohibitive amount of time taken up in the preparation of the lithographic plates to make them ready for application to the printing drum.

It is, therefore, one object of the present invention to provide a system for materially increasing the speed of production of lithographic plates, particularly for use in the colour printing of newspapers and also to provide apparatus for edge-forming already prepared lithographic plates, so that they may readily be applied to the printing drum. The expression "already prepared" means plates that have been exposed, registered and processed, ready for printing.

From one aspect, therefore, the invention consists in a system for preparing lithographic plates which comprises a light box arrangement for printing down the plates fed thereinto from prepared masters, whereafter the exposed plates are conveyed to a processing station where they are developed and fixed with intermediate and subsequent washing steps as required, afterwhich they are fed to an edge forming station in which the edges of the plates are prepared and edge-formed for transfer to a printing drum.

A machine for carrying out this system would comprise five sections, viz: a loading, exposing, processing, plate forming and delivery sections, at which latter section, the finished plate becomes available for application to the printing drum.

In the loading section, the unexposed plate, which is located to a suitable frame in an exact position and a film original which also is located to another frame in an exact position, are brought together. The film original itself is delivered to this section with its image in register relative to register holes, slots or edges with which to locate it to its frame or to the plate. Similarly, the plate is fed to this section with register holes, slots or edges whereby it may be located to its frame or to the film. The two assemblies are brought together so that the film image will be in an exact and predetermined position relative to the locations provided on the plate.

After loading, the assembly is then fed into the next section where it is exposed through the film image by a powerful light, e.g. a Mercury Vapour lamp and preferably with a line or spot scanning action so that each part of the assembly receives exactly the same amount of light. The assembly is then opened in subdued light and the exposed plate transferred to the processing section, whereupon the film original is sent back to the first section or retained in the exposure section to await another plate, if more than one plate is required from the same plate original.

In the processing section, the plate is first developed by appropriate fluids, dependent upon the emulsion characteristics and kind of image required and the manufacturer's directions, afterwhich it is washed, fixed and, may be, dried.

Thereafter, the plate is located with respect to the plate edge-forming section from its location points, e.g. register holes, slots or notches, in the same way as it is located at the exposing stage and the plate is sent through the bending unit on these locations. Therefore, the bends or other forming actions on the plate will locate it exactly in the correct positive relative to the printing image.

As a result of the system, it is possible to adopt a flow line technique in the production of the plates, whereby the speed of production is materially increased as compared with prevailing systems where plates are individually handled, exposed, registered, processed and formed for application to the printing drum.

Conveniently, the plates may be provided with register holes or other apparatus by the method and apparatus disclosed in our prior specification No. 506.

In order to edge-form the plates after processing, the invention also provides a machine which comprises a fixed former plate, to which lithographic plates are feedable in sequence by a travelling pin system engageable in register pin holes provided in the edges of the lithographic plate, a set of rollers being located in juxtaposition to said former plate, a clamping device arranged initially to clamp the lithographic plate in relation to the fixed former plate, means for withdrawing the pins from said register holes and means for applying said set of rollers against the projecting edge of the plate to form said edge over an edge of the former plate.

This arrangement ensures a high degree of accuracy in the forming of the shaped edge of the lithographic plate for its accurate location on the printing drum. It will be clear to those skilled in the art that, in colour printing, the individual colour printers formed by a set of lithographic plates, must be located in exact register on the drum or drums, so as to avoid the formation of colour fringes and other faults that would make the finished work completely unacceptable.

Figure 6:
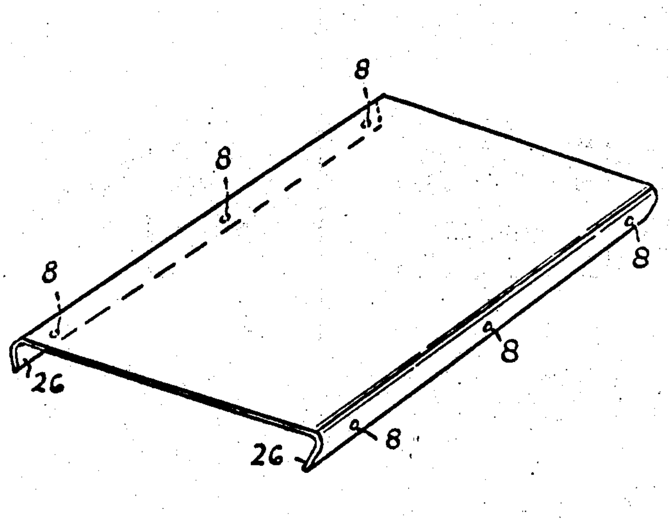
Figure 2:
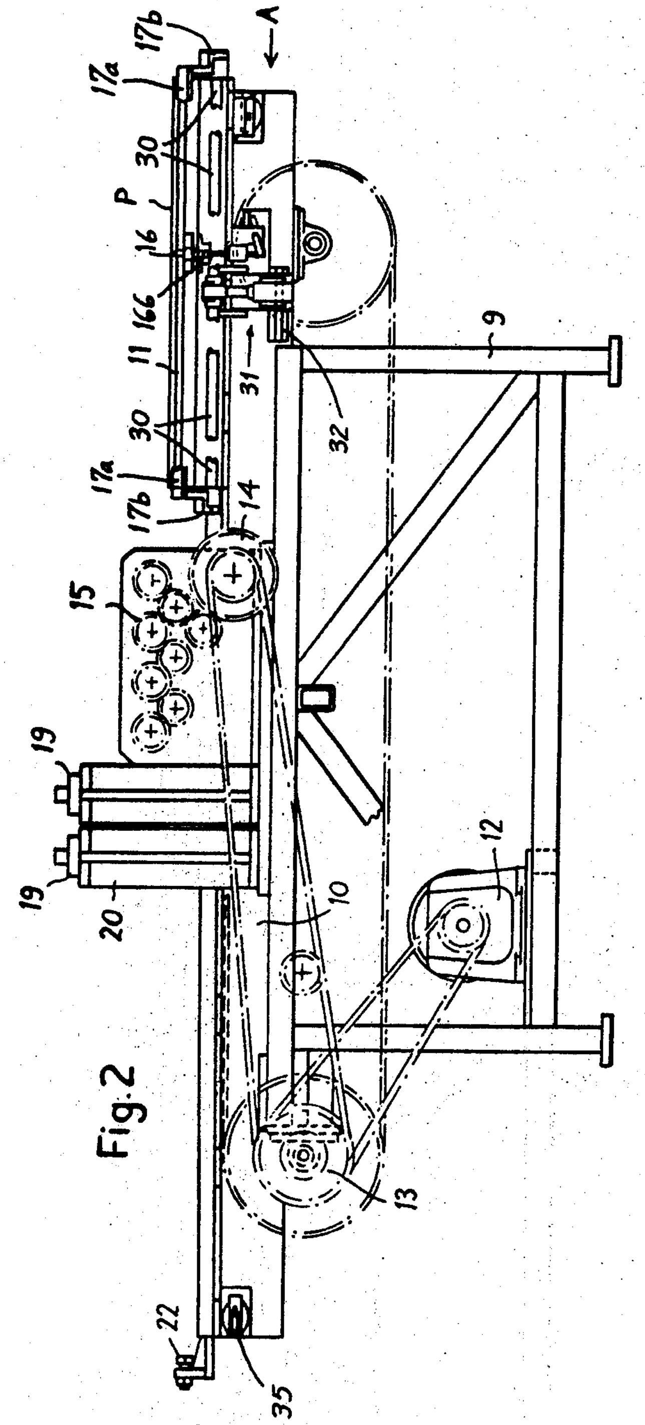
Figure 3:
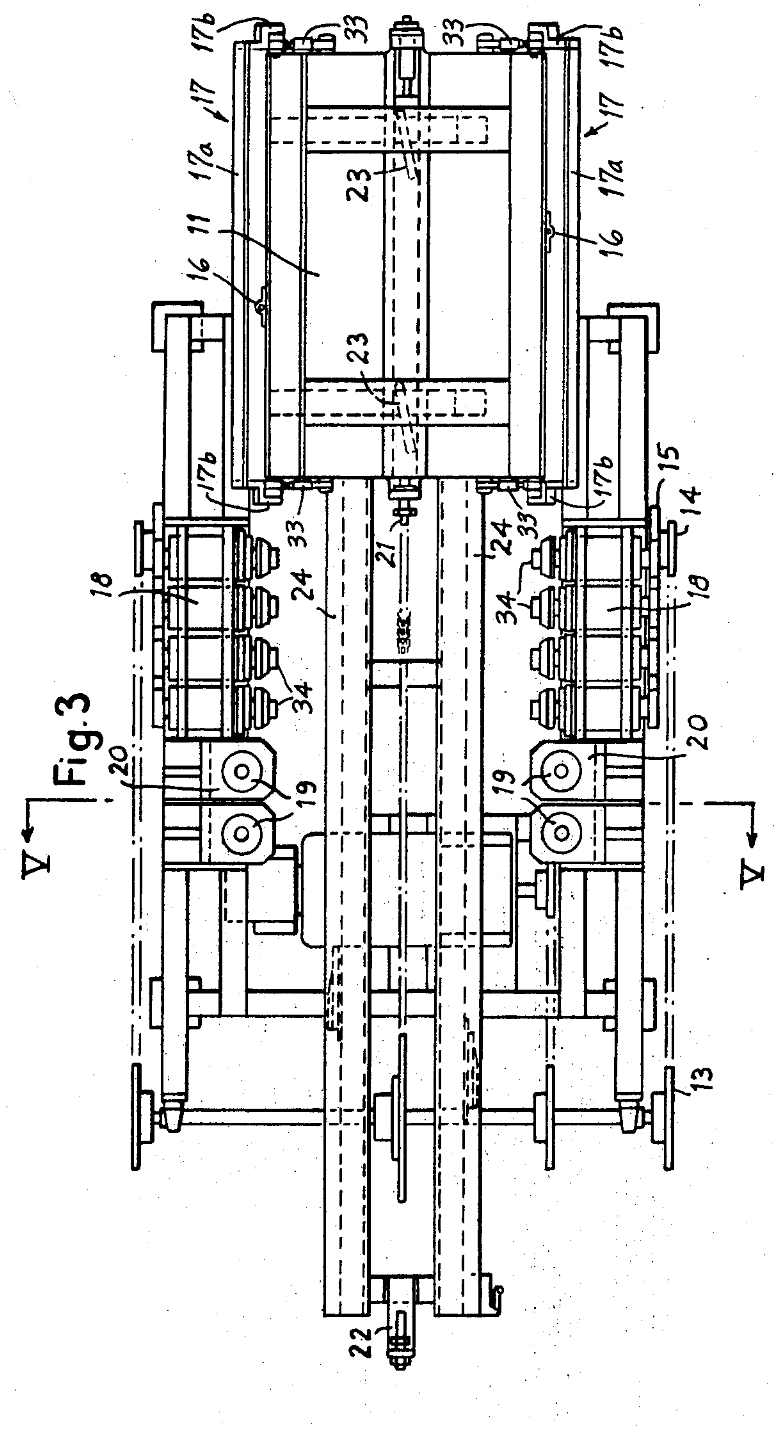
Figure 4:
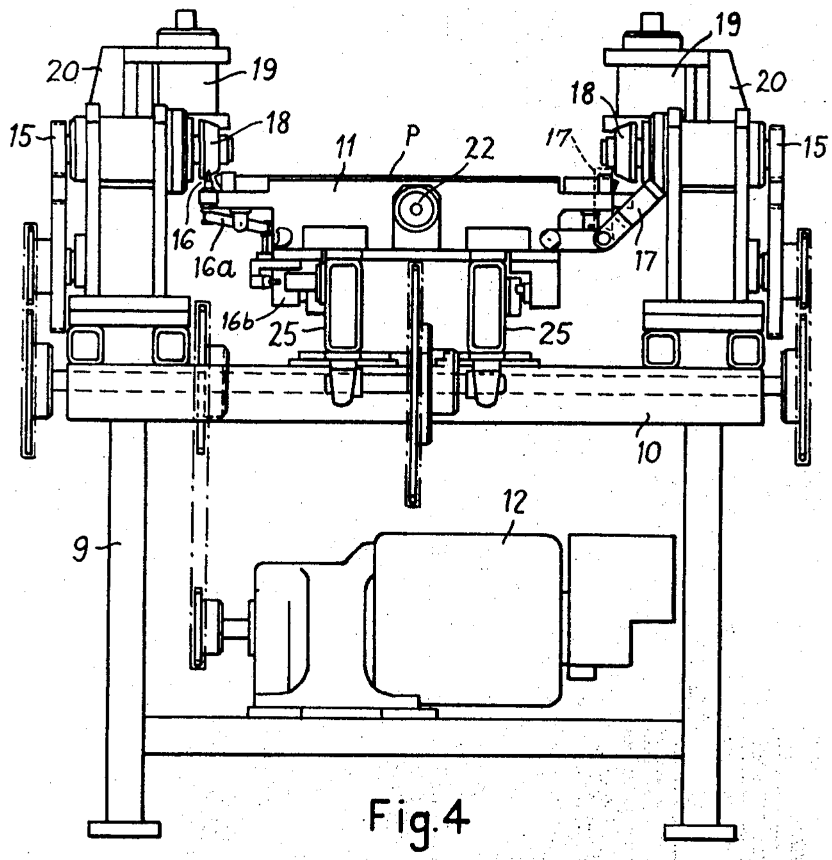
Figure 5:
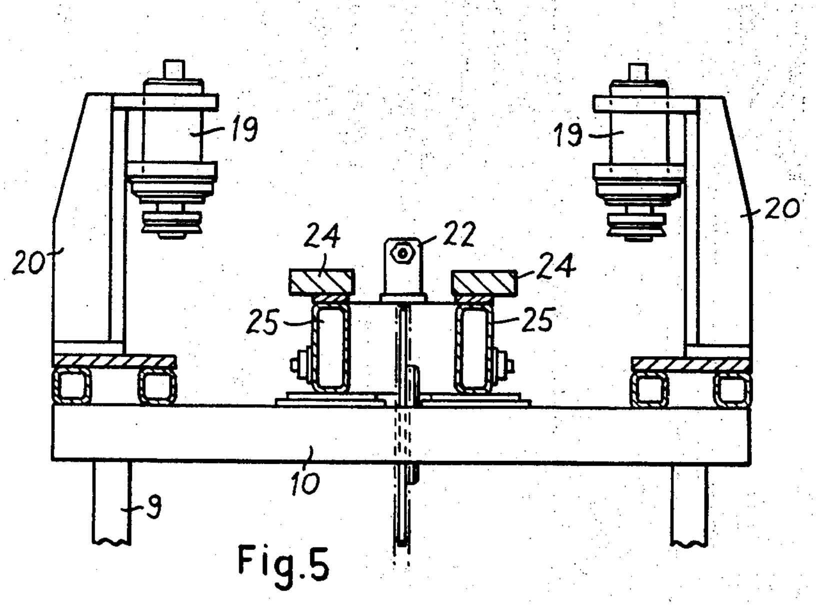

In order that the invention may be more clearly understood, reference will now be made to the accompanying drawings which show one embodiment thereof by way of example, and in which:

FIG. 1 shows a flow diagram of a complete system for preparing lithographic plates, FIG. 2 shows a side elevation of a plate edge-forming machine, FIG. 3 shows a plan view of the machine, FIG. 4 shows an end elevation of the machine, FIG. 5 shows a section through the machine along the line IV—V of FIG. 3, and FIG. 6 shows a perspective view of a prepared and edge-formed lithographic plate made on the machine of FIGS. 2 to 5.

Referring now to the drawings, FIG. 1 shows a flow diagram for the preparation of a lithographic plate, and wherein a light box 1 receives an exposed master such as a film from a camera 2 and also an unexposed lighographic plate from a punch 3 which latter forms in edge areas thereof register holes for association with register pins on the machine to be described later. In the light box 1 the lithographic plate P (see FIG. 6) is printed down from the master represented by the film from camera 2 and accurately located as to register by the register holes 8, whereafter the exposed lithographic plate is conveyed by a transfer system 4 to a processing station 5 in which the plate is developed and fixed with intermediate and subsequent washing steps as required, after which it is fed by hand to an edge-forming machine represented in FIG. 1 by 6 and in which the edges of the plates are prepared and edge-formed for delivery to the printing drum via a transfer system depicted at 7. After printing down, the film or other master is removed for filing.

The light box 1 can take any desired form known in the art as can the transfer systems 4 and 7 and the processing station 5. The punch, indicated at 3, may also take any conventional form to provide register holes 8 in edge areas of the plate P. As many apertures 8 as are required may be made. Since the apparatus of the light box, the punch, the processing station and the transfer systems may take any one of the forms well-known to those skilled in the art, there is no necessity further to illustrate them in this specification.

FIGS. 2 to 5 show an embodiment of edge-forming machine for preparing the lithographic plates coming from the processing station 5. The machine comprises a frame 9 having a bed 10 upon which a former 11 including a former plate can be longitudinally moved by any desired drive means indicated as a motor 12 and gearing 13, 14, 15 with appropriate drive belts as shown. The final gearing from the drive gear system 15 cooperates in any well-known or desired manner with the former 11 for reciprocation thereof. Each lithographic plate P is loaded by hand on to the machine. A pin system includes a plurality of pins 16 of which two only are shown in FIG. 3 and which are mounted in respective housings on the former 11 so that the pin system travels with the former and the plates can be fed in sequence. The pins 16 are engaged in the register pin holes of the plate P, so as to securely locate the platein relation to the former so that the longitudinal edges of the plate P project beyond the adjacent edges of the former. The register pins 16 are operated by levers 16*a* engaging with respective cam wedges 16*b* mounted on the machine frame. In order to instal the plate on the former, any suitable desired clamp device is provided such as the two clamps schematically illustrated at 17. In the travel of the former 11 through the machine, the plate P firstly contacts a series of horizontally-mounted bevelled rollers 18 on either side of the machine which are arranged to turn down the longitudinal edge of the plate over the edge of the former. After passing through the series of horizontally-arranged rollers, the plate edges are finally formed by a system 19 of vertically-mounted rollers suitably supported by brackets 20.

The clamps 17 are disposed on opposite sides respectively of the former 11 and each comprise a longitudinal clamping member 17*a* pivotally mounted on the former at its ends by clamping members 17*b* fixed thereto. To the end members 17*b* are fixed longitudinal rotatable clamp operating shafts 30, to which are connected link mechanisms 31 of which one only is shown in FIG. 2. Each link mechanism 31 is actuated by a respective cam 32 to turn the shaft 30 and thus the clamp members 17*b* and 17*a* as the former reaches its right hand position thereby opening the clamps 17 into the position illustrated in which they do not impede the locating of a fresh plate P on the pins 16. As the former moves in the direction of the arrow A for an edge-forming operation, the link mechanisms move down and disengage the cams 32 and allow each clamp to be urged into its closed position illustrated in dotted lines in FIG. 4 by the action of springs 33. In the closed position the clamping members 17*a* engage with the lithographic plate P inwardly of its projecting edges and the pins 16, clamping the plate P against the former and being held down by engagement with roller portions 34 projecting inwardly from the rollers 18. As the former moves between its right handposition and the first of the rollers 18, the register pins 16 are withdrawn downwardly by movement of levers 16*a* down the cam wedges 16*b* so that the register pins are clear of the rollers during the edge-forming. As the former moves back into its right hand position the pins 16 are moved upwardly by the levers 16*a* engaging the cam levers 16*b* into their illustrated positions for the location of a fresh lithographic plate.

At the end of the former travel, determined by a micro switch 35, a spigot 21 projecting therefrom contacts an abutment 22 whereby a system of wedges 23 contained within the former is moved so as to cause the overall width of the former to be reduced in a manner which will be clear from the drawings. This reduction in width of the former enables the formed lithographic plate easily to be removed from the machine.

In its travel through the machine, the former 11 rides on sliders 24 supported by the bed members 25 secured to the bed 10 and frame 9 as will be seen more particularly from FIG. 5.

After removal from the machine, the lithographic plate P has the form shown in FIG. 6 with turned-over edge lips 26 of a form determined by the shape and disposition of the horizontal and vertical roller systems 18 and 19, respectively. Thus, the lip shape shown in FIG. 6 is not mandatory.

When loaded onto the printing drum, the lips 26 are engaged in a slot thereof and tightly clamped.

It will be appreciated that the drive of the machine shown in FIGS. 2 to 5 follows standard engineering practice and, since the details thereof may be varied as dictated by requirements, only those integers thereof necessary for an understanding of the invention have been specifically described and referred to. However, the general functioning and layout of the machine will be appreciated from the drawings.

We claim:

1. A method of edge-forming lithographic plates to prepare such plates for printing, said method comprising the steps of:

a. mounting a lithographic plate in a located position on a former plate by moving a plurality of pins mounted on the former plate upwardly of the former plate to engage said pins in register pin holes provided in edges of the lithographic plate whereby at least one edge of the lithographic plate projects beyond an adjacent edge of said former plate,
b. clamping said lithographic plate on said former plate in said located position,
c. driving said former plate in a linear path,
d. withdrawing said pins downwardly out of their engagement in said register holes in the clamped lithographic plate as said former plate begins its movement along said linear path, engaging said at least one projecting edge of said lithographic plate with a first set of rollers to turn the said at least one projecting edge downwardly over said adjacent edge of said former plate, f. engaging said downwardly-turned edge with a second set of rollers to inwardly incline said downwardly-turned edge at an acute angle with respect to said lithographic plate about said adjacent edge of said former plate, and g. reducing the dimension of said former plate transverse to the direction of its travel whereby the edge-formed lithographic plate can be removed from said former plate.

2. A machine for edge-forming lithographic plates to prepare such plates for printing, said machine comprising, in combination, a. a frame, b. a former plate for a lithographic plate, mounted on said frame for longitudinal movement with respect thereto, c. drive means for effecting said longitudinal movement of said former plate, d. a pin system travelling with said former plate and including a plurality of register pins which are movable upwardly with respect to said former plate to engage in register pin holes provided in edges of said lithographic plate thereby to mount said lithographic plates on said former plate in a located position in which at least one edge thereof projects beyond an adjacent edge of said former plate, e. clamping means mounted on said former plate to clamp said lithographic plate on said former plate in said located position, f. a set of edge-forming rollers mounted on said frame adjacent an edge-forming area of said former plate extending lengthwise of the machine, said edge-forming rollers comprising a plurality of horizontally mounted rollers for turning down said at least one edge of the lithographic plate over said adjacent edge of said former plate, and a plurality of vertically mounted rollers for inclining said downwardly-turned edge of said lithographic plate inwardly about said adjacent edge of said former plate at an acute angle with respect to said lithographic plate, g. means for effecting engagement of said pins in said register pin holes in said lithographic plate and withdrawal of said pins downwardly from said register holes as said former plate commences its movement and before said former plate reaches said rollers, h. means for reducing the dimension of said former plate transverse to the direction of its travel subsequent to inclining said downwardly-turned edge, whereby the edge-formed lithographic plate can be removed from said former plate.

* * * * *